(12) United States Patent
Puide et al.

(10) Patent No.: US 6,450,739 B1
(45) Date of Patent: Sep. 17, 2002

(54) TOOL FOR CHIP REMOVING MACHINING AND METHODS AND APPARATUS FOR MAKING THE TOOL

(75) Inventors: Mattias Puide, Fagersta; Johnny Bruhn, Norberg; Mikael Grönkvist, Norrköping, all of (SE)

(73) Assignee: Seco Tools AB, Fagersta (SE)

( * ) Notice: Subject to any disclaimer, the term of this patent is extended or adjusted under 35 U.S.C. 154(b) by 68 days.

(21) Appl. No.: 09/607,364

(22) Filed: Jun. 30, 2000

(30) Foreign Application Priority Data

Jul. 2, 1999 (SE) ................................................ 9902595

(51) Int. Cl.[7] ........................... B23B 51/02; B21K 5/04; B22F 1/00; B22F 3/20
(52) U.S. Cl. ........................ 408/144; 408/59; 76/108.6; 72/258; 419/36; 425/133.1
(58) Field of Search ........................... 408/144, 57, 59; 419/36, 37; 425/131.1, 133.1; 76/108.1, 108.6; 72/253, 258, 264

(56) References Cited

U.S. PATENT DOCUMENTS

| 3,336,614 | A | | 8/1967 | Benjamin |
| 4,462,778 | A | * | 7/1984 | Calcagni .................. 425/133.1 |
| 4,642,003 | A | | 2/1987 | Yoshimura |
| 4,779,440 | A | | 10/1988 | Cleve et al. |
| 4,813,823 | A | | 3/1989 | Bieneck |
| 4,881,431 | A | * | 11/1989 | Bieneck .................... 76/108 R |
| 5,641,920 | A | * | 6/1997 | Hens et al. .................... 419/36 |
| 5,737,683 | A | * | 4/1998 | Sterzel ......................... 419/36 |
| 5,780,063 | A | * | 7/1998 | Friedrichs ................ 425/131.1 |
| 5,947,660 | A | | 9/1999 | Karlsson et al. |
| 6,274,082 | B1 | * | 8/2001 | Nagahora et al. .............. 419/5 |

FOREIGN PATENT DOCUMENTS

| JP | 62-130111 | 6/1987 |
| JP | 1-240215 | 9/1989 |
| JP | 2-95506 | 4/1990 |
| JP | 3-73210 | 3/1991 |
| JP | 3-170215 | 7/1991 |
| JP | 5-92329 | 4/1993 |
| WO | WO96/20057 | 7/1996 |
| WO | WO98/28455 | 7/1998 |

* cited by examiner

*Primary Examiner*—Steven C. Bishop
(74) *Attorney, Agent, or Firm*—Burns, Doane, Swecker & Mathis, L.L.P.

(57) ABSTRACT

A tool for chip-forming machining is made by passing first and second compounds through first and second coaxial dies, respectively, whereby the first material forms a center core of the tool, and the second material forms an outer rod of the material. The material of the core is tougher and less wear-resistant than the material of the outer rod. The coaxial first and second compounds are passed through a shaping die and then through a flute-forming structure which forms chip flutes in the outer rod.

19 Claims, 5 Drawing Sheets

TOOL FOR CHIP REMOVING MACHINING AND METHODS AND APPARATUS FOR MAKING THE TOOL

FIELD OF THE INVENTION

The present invention relates to a tool for chip removing machining comprising a relatively tough core connected to a relatively wear resistant outer periphery, and to methods and apparatus for making the tool.

BACKGROUND OF THE INVENTION

It is previously known through for example WO 98/28455 to press a core and a surrounding tube of material powder in two steps. The material powder comprises wolfram carbide (WC), also known as tungsten carbide, together a with cobalt (Co) binder that are compressed between a punch and a die, and that subsequently are sintered such that the binder metal is melted and binds the carbide to form a tool material for chip removing machining. Thus, there results a tube formed around, and connected to, an inner core. The core has a higher binder (cobalt) ratio than does the tube, whereby the core is tougher than the tube, but the tube is harder and more wear resistant than the core.

That known technique brings about a plurality of drawbacks during manufacture of elongated slender bodies. The powder gives off dust, and the formed green body (pressed but not sintered material) will not endure handling to any degree. Furthermore the chip flutes must be formed by grinding which is time consuming. The problems have partly been solved by the injection molding of hard metal mixed in a carrier such as indicated in U.S. Pat. No. 5,947,660. The method of injection molding brings about a high degree of freedom concerning geometry but brings about troubles during manufacture of elongated slender bodies and costly investments in molds.

U.S. Pat. No. 4,779,440 discloses that an extruded drill blank having chip flutes of constant pitch along the circumference of the blank can be obtained by heating a hard metal powder to extrusion temperature, and pressing the heated powder under high energy consumption through a space defined by a mandrel and a nozzle while rotating the blank. The blank is guided during the extrusion step past a helical ridge provided inside of the nozzle, to shape chip flutes along the blank. A drawback of the known technique is that the useful life of the tool is less than desired.

OBJECTS OF THE INVENTION

One object of the present invention is to provide a method and a device, whereby the drawbacks of the known technique are eliminated.

Another object of the present invention is to provide a method and a device whereby elongated slender bodies can be manufactured having optimum length of service time.

SUMMARY OF THE INVENTION

These and other objects have been achieved by a method and a device for manufacturing a tool, as well as a tool itself. The method aspect of the present invention involves a method for manufacturing a tool for chip removing machining. The tool comprises a central portion disposed within an outer peripheral portion. The central portion is formed of a tougher, less wear-resistant material than the outer peripheral portion. The method comprises the steps of:

A) feeding a warm first plastic compound comprised of a hard material and metallic binder to an inner extrusion die for forming the central portion;

B) simultaneously feeding a warm second plastic compound comprised of a hard material and metallic binder to an outer extrusion die arranged coaxially with the first die, for forming the outer peripheral portion coaxially around the first plastic compound, whereby the second plastic compound abuts the first plastic compound during the extrusion, the second plastic compound being more rear-resistant and less tough than the first plastic compound; and C) heating the first and second plastic compounds as a unit to drive off a polymer present in those compounds and to sinter the remainder of those compounds into a hard blank.

Another aspect of the invention pertains to an apparatus for making a tool for chip forming machining. The apparatus comprises a housing having a recess extending therethrough for conducting extruded material. First and second coaxial nozzles are arranged for coaxially conducting first and second compounds into an inlet end of the recess, for forming a central core and an outer tube connected to the central core. A die disposed in the recess contains a hole through which the first and second compounds pass.

The invention also pertains to a tool for chip removing machining which comprises a center core and an outer tube. The center core and the outer tube are formed of respective first and second compounds, wherein the first compound is tougher and less wear-resistant than the second compound. The tool includes a front cutting edge and a chip flute for each cutting edge. The chip flute is disposed entirely in the outer tube. The tool is formed by the steps of:

A) feeding the first and second compounds to first and second coaxially arranged dies, whereby the first and second compounds form the core and the tube, respectively; and B) heating the first and second compounds as a unit to drive off a polymer contained by the first and second compounds, and to sinter the remainder into a hard blank.

BRIEF DESCRIPTION OF THE DRAWINGS

The objects and advantages of the invention will become apparent from the following detailed description of a preferred embodiment thereof in connection with the accompanying drawings in which like numerals designate like elements and in which.

DETAILED DESCRIPTION OF A PREFERRED EMBODIMENT OF THE INVENTION

Figure 1B:
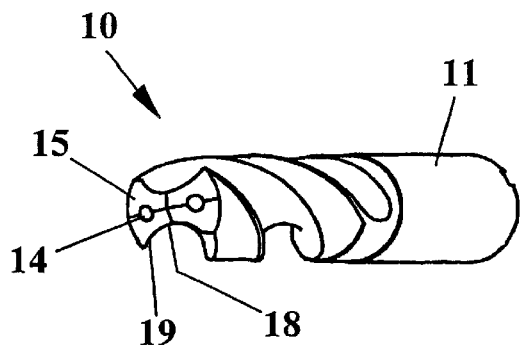
FIG. 1B is a front perspective view of the tool depicted in FIG. 1A.
Figure 1A:
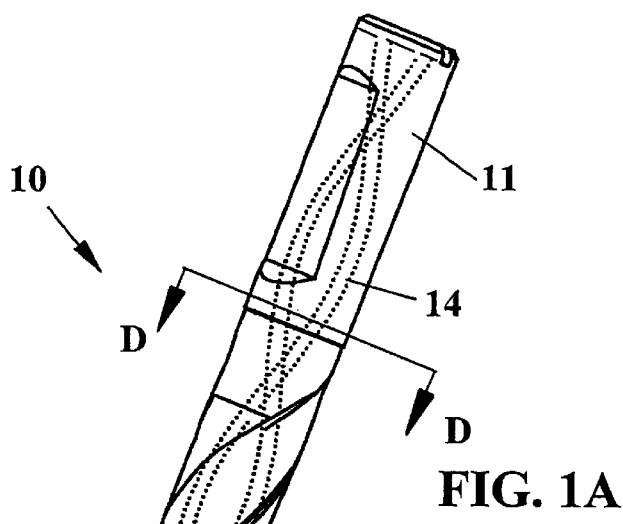
FIG. 1A is a schematic side elevational view of a tool formed in accordance with the present invention.
Figure 1C:
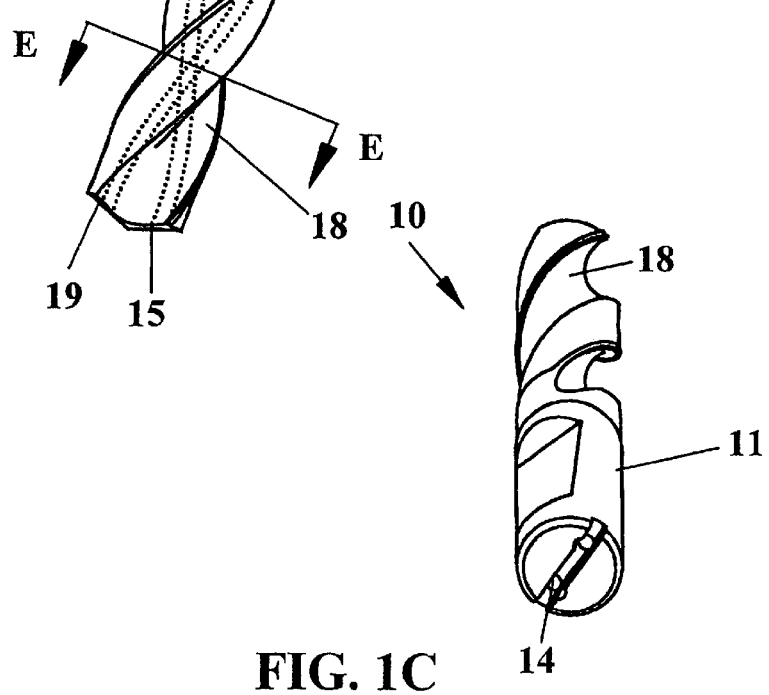
FIG. 1C is a rear perspective view of the tool depicted in FIG. 1A.

The embodiment of a tool shown in FIGS. 1A–1C is a so-called helix drill. The drill 10 comprises a substantially solid shank 11 having a first tip forming end comprising at least one cutting edge 19, and a number of chip flutes 18 that are equal in number to the cutting edges. The drill comprises a central core portion of relatively tough hard material connected to an outer peripheral tube portion 13 of relatively wear resistant hard material. The drill 10 is made of solid hard material, such as extruded hard metal, and the helical chip flutes 18 can extend along the entire body or along a part thereof. The shank 11 shall be secured into a rotatable spindle, not shown. The drill has two upper clearance surfaces 15.

The drill is extruded from two different materials where the difference between the materials lies in the relative ratio of hard substance (for example wolfram carbide, WC) to binder (for example cobalt, Co). That is, the central portion has a larger binder ratio than the outer peripheral portion and thus is tougher, but less brittle (less wear resistant) than the outer portion. All external surfaces and associated edges are made from the same material, i.e. extruded wear resistant hard metal with a relatively low content of cobalt. The chip flutes 18 of the tool 10 are formed entirely of wear resistant hard material that gives both strength and wear resistance to the drill. That is, the radial thickness of the hard tube portion is large enough that flutes of ample depth can be formed entirely therein. For example, as can be seen from FIG. 1E, a minimum thickness Y of the tube portion 13 at the deepest part of the flute 18 is at least as great as one-twentieth of the maximum drill diameter $$\left(\text{i.e., } Y \geq \frac{D}{20}\right).$$

Figure 1D:
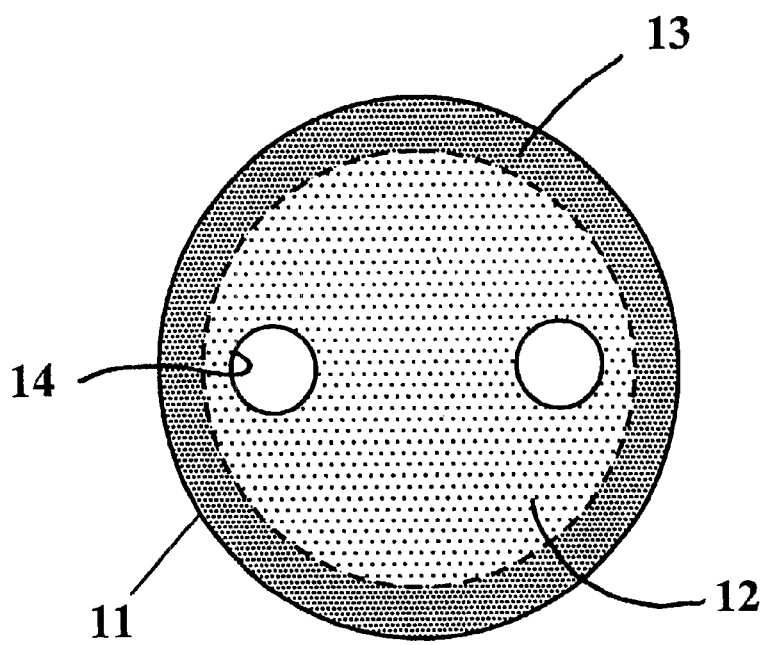
FIG. 1D is a cross-sectional view taken along the line D—D in FIG. 1A.
Figure 1E:
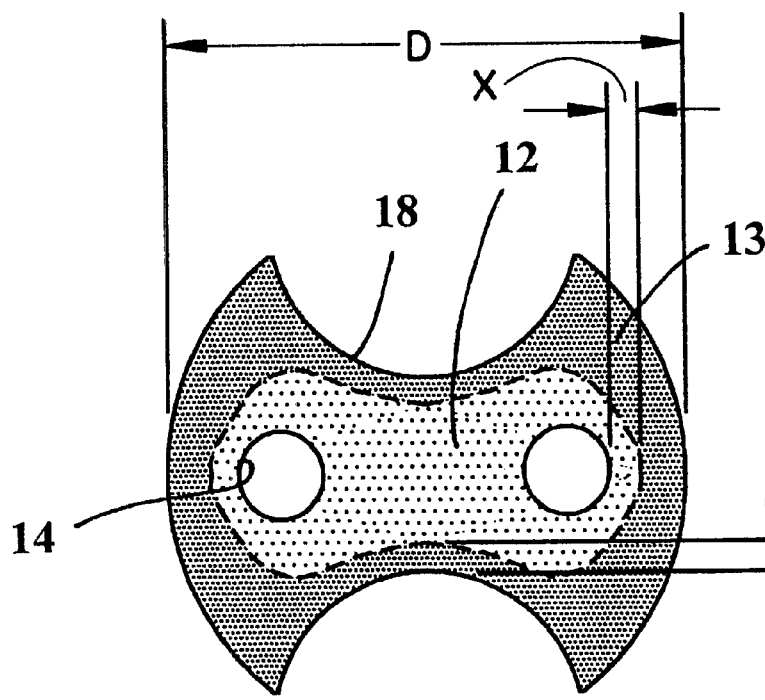
FIG. 1E is a cross-sectional view taken along the line E—E in FIG. 1A.
Figure 2A:
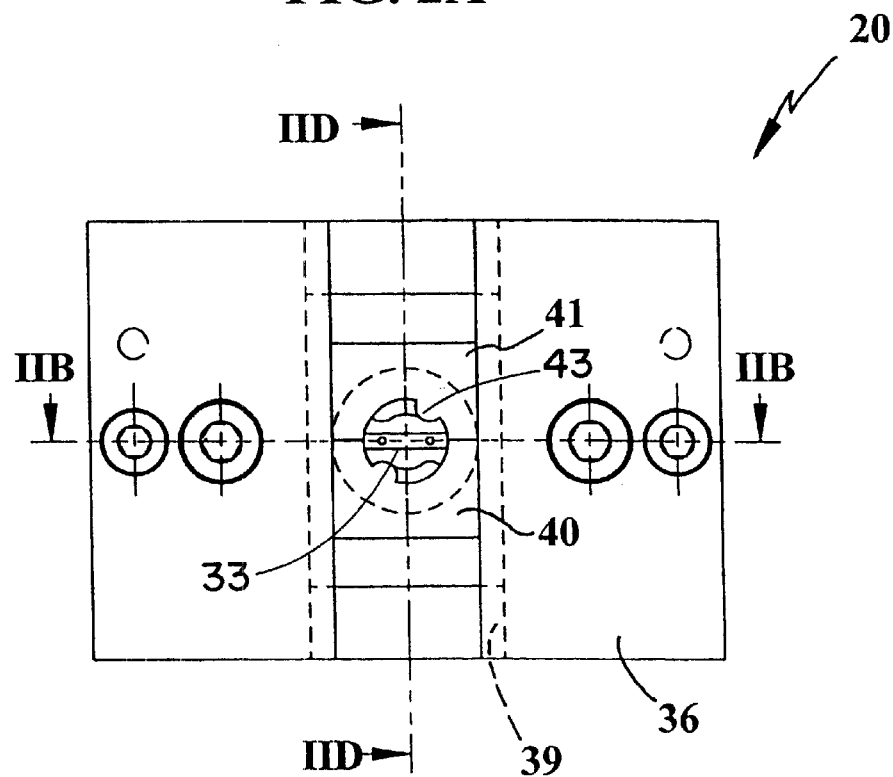
FIG. 2A is a front elevational view of an apparatus for the manufacture of elongated green bodies, according to the present invention.
Figure 2B:
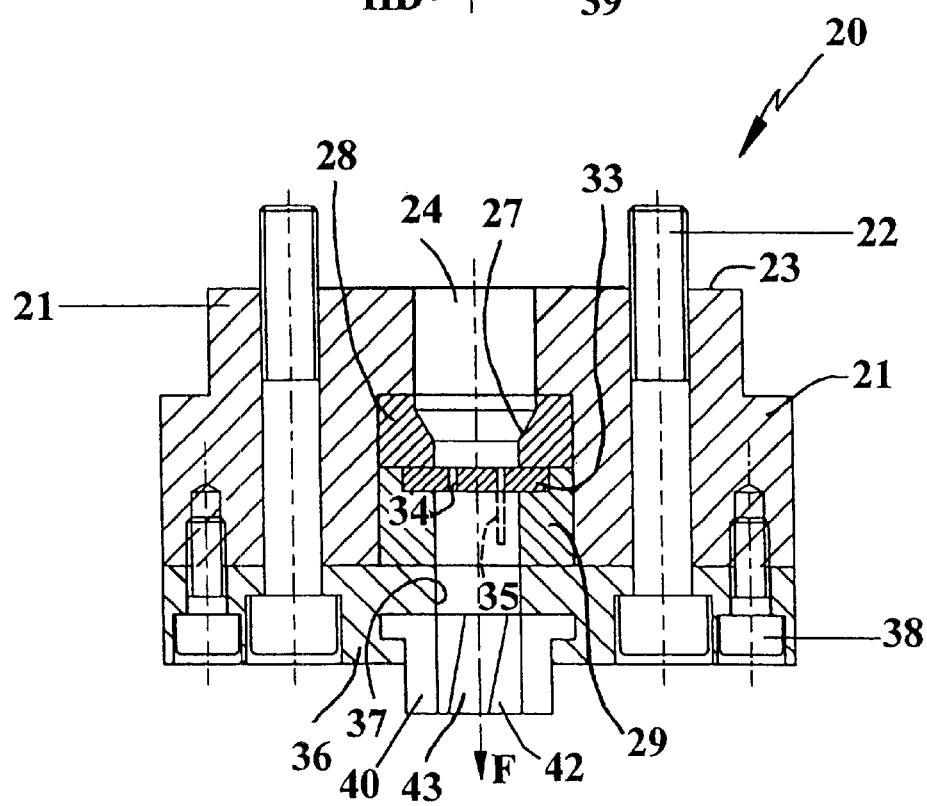
FIG. 2B is a longitudinal sectional view taken along the line IIB—IIB in FIG. 2A.
Figure 2C:
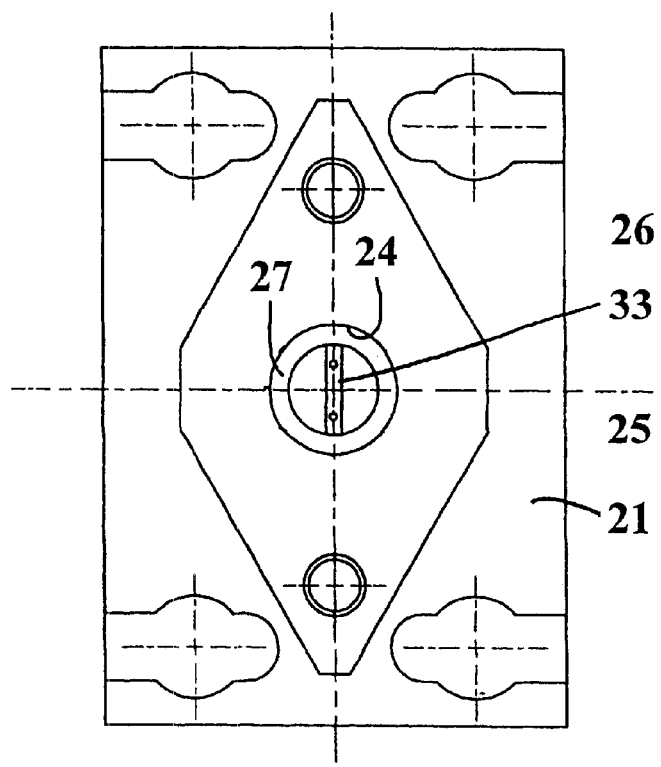
FIG. 2C is a rear elevational view of the apparatus depicted in FIG. 2A.
Figure 2D:
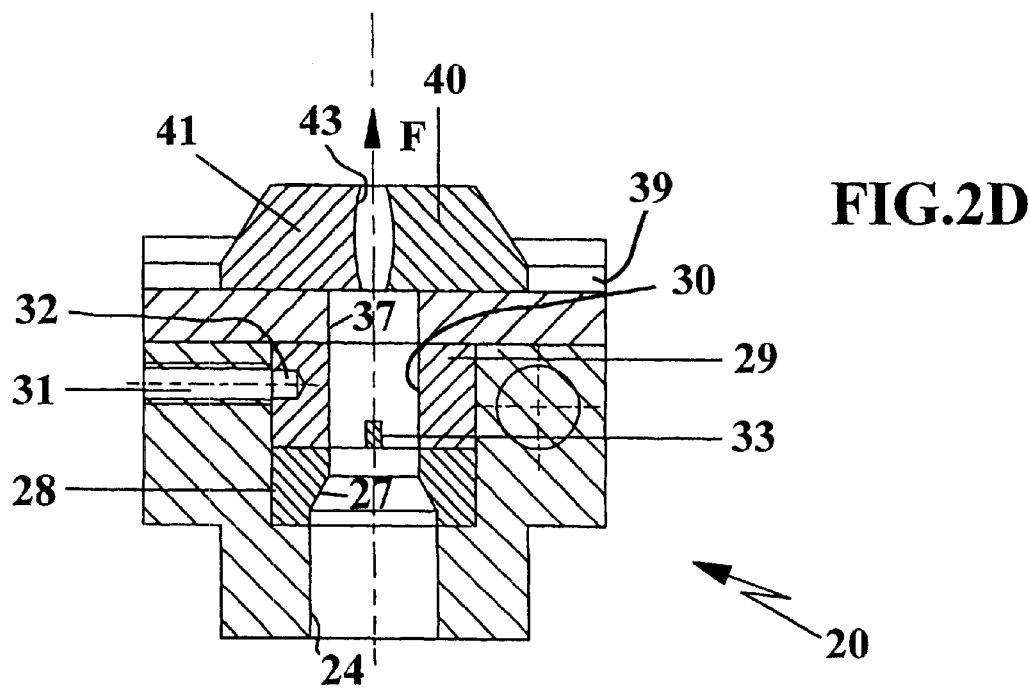
FIG. 2D is a sectional view taken along the line IID—IID in FIG. 2A.

As is obvious from FIGS. 1D and 1E the major part of the cross-sectional area is formed by the tough core portion 12 that is completely surrounded by the wear resistant tube portion 13 except at its ends. A rigid and hard "shell" is thereby obtained on the drill.

Furthermore, the flush channels 14 preferably extend only in the tougher central portion. That is, the minimum thickness X of the core surrounding the flushing channels is at least equal to one-twentieth of D $$\left(\text{i.e., } X \geq \frac{D}{20}\right).$$

Lines of intersection of the chip flutes 18 with the clearance surfaces 15 form the main cutting edges 19, preferably via reinforcing chamfers, not shown.

A device 20 according to the present invention for the production of elongated green bodies is shown in FIGS. 2A–2D. The device 20 comprises a rectangular steel housing 21, which is intended to be fastened by for instance bolts to an extrusion machine 5a (see FIG. 3). The housing 21 has two bolts 22 to be fastened in the machine and has a rear surface 23 intended to seal against said extrusion machine. The housing has a central through-going recess 24 through which at least two compounds will be pressed. The recess 24 transforms into a diameter-reducing restriction 27 disposed in a circular nozzle 28. The nozzle 28 is made from a wear resistant material such as hard metal. The recess 24 then continues via a cylindrical inner, centrally positioned hole 30 of a circular die 29, which is provided next to the nozzle 28. The position of the die 29 relative to the housing is determined by cooperation between a stop screw 31 in the housing and a hole 32 extending laterally relative to the principal feed direction F of the compounds.

A bar-shaped core member 33 is disposed in the die. The core member is rectangular and includes two holes 34 to receive elongated pins 35. The pins 35 are intended to project from the core member in the feed direction F in case flush channels are to be formed in the blank.

The recess 24 then continues in the form of a coaxial hole 37 formed in a lid 36. The lid 36 is attached to the housing by means of two screws 38 and screws 22. The lid 36 is provided with a T-groove 39, which extends between two long sides of the lid 36. The groove 39 is intended to receive two jaws 40, 41, which are disposed adjacent an outlet of the recess 24, 37 and together form a T-shape, see FIG. 2B. Each jaw 40, 41 includes a recess 42 facing towards the other jaw. Each recess 42 includes a helical ridge 43 shaped to form a chip flute such that when the jaws lie against each other, the recesses form the cross-section of a helix drill having chip flutes. The jaws are pressed against each other in a radial direction, i.e., laterally of a central axis of the device, by suitable power means, not shown, and the same power means is used to separate the jaws, such as when the blank must be non-fluted, for example along a mounting portion of the drill shank. Preferably a supporting table is placed in connection with the jaws to support the hot extruded blank.

Figure 3:
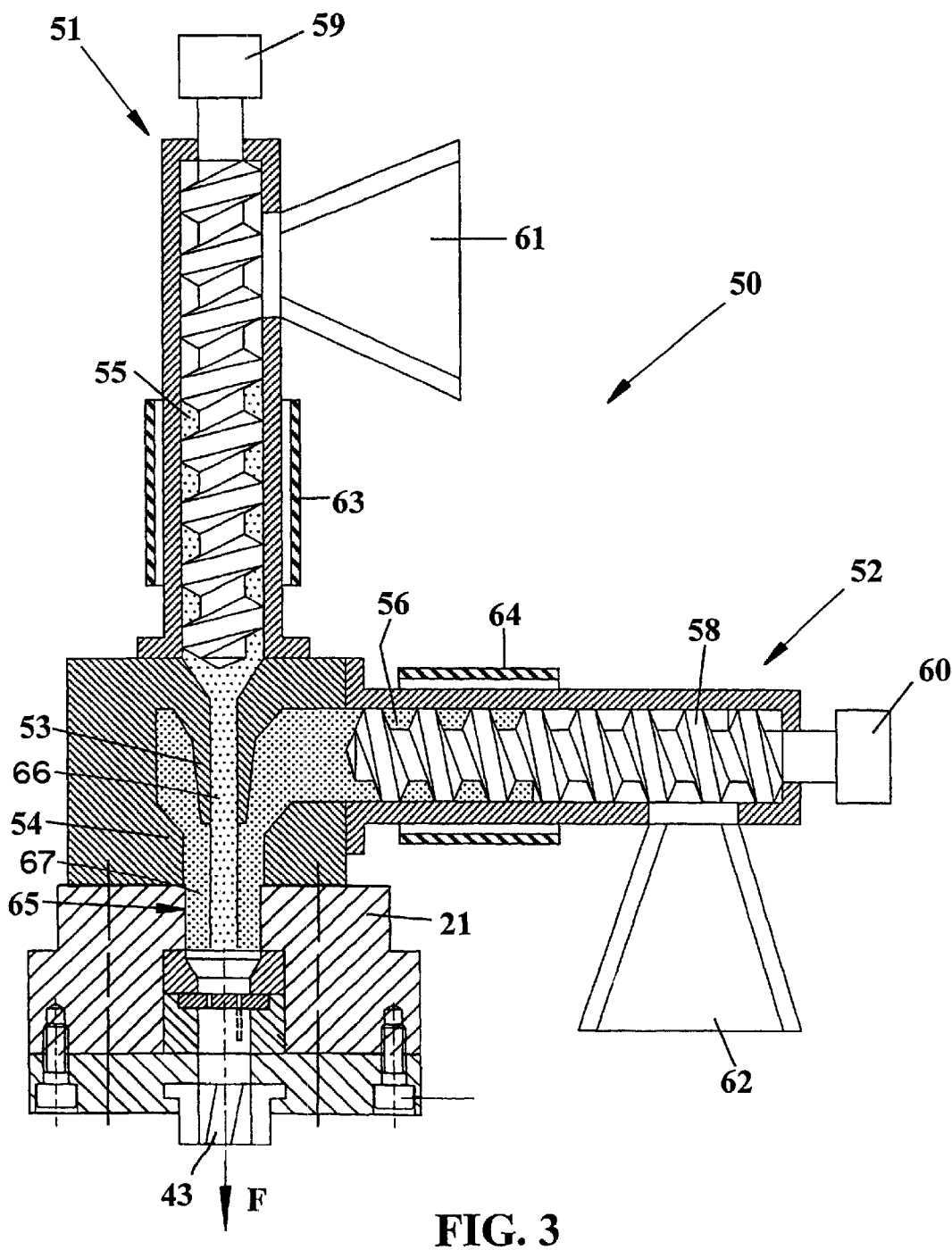
FIG. 3 is a longitudinal sectional view taken through the apparatus depicted in FIG. 2A connected to an extrusion device according to the present invention.

The extrusion machine, or feed device, 50 connected to the housing 21 is shown in FIG. 3. The feed device 50 comprises at least two separate chambers 51, 52. A central one of the chambers 51 is of substantially symmetrical configuration about the feed direction F and comprises a central nozzle 53 facing towards the housing 21. At least one transverse chamber 52 is substantially perpendicular to the feed direction F and comprises a nozzle 54 provided in connection with the nozzle 53. The nozzle 54 is co-axial with the nozzle 53 but is axially closer to the house 21 than is the nozzle 53. The first chamber 51 contains a first compound 55 having a relatively high cobalt ratio, while the second chamber 52 contains a second compound 56 having a lower cobalt ratio. The chambers comprises feed worms 57, 58 to drive the two compounds forwards in the feed direction F. Each feed worm is driven by a motor 59, 60. The granules are fed into funnel-like openings 61, 62. The chambers are at least partially surrounded by heaters 63, 64.

The drill or the end milling cutter is manufactured as follows. Hard metal powder having a certain cobalt content and a carrier, for example a polymer, is mixed into compounds and shaped to pellets or granules. That is done such that at least two different compounds are obtained, where the difference lies in the ratio of cobalt binder which will be the matrix of the green body. The difference in the binder ratio lies within the interval of 1–10 percentage points by weight. The term "cobalt" shall here be understood as a metallic binder that alternatively can be exchanged for or include other metals, for example nickel, Ni.

Then the compounds are preheated to a temperature suitable for the compounds, preferably to the same temperature, and they are inserted into the extrusion machine 50 to be extruded into a rod 65. The compounds are heated to a certain temperature (about 180° C.) in the respective chambers 51, 52 and pressed at high pressure towards the respective nozzles 53, 54, whereby the first plastic compound will form a core 66, and the second plastic compound will abut against said first plastic compound and form a substantially cylindrical rim or tube 67 extending around the core 66. Together, the core 66 and the tube 67 form a rod 65. Then the still-hot rod reaches the core member 33 and passes each side of the core member through the two substantially semi-circular openings formed about the core. The width of the core member 33 (see FIG. 2A) is preferably less than the diameter of the inner compound 66. Rearwardly (downstream) of the core member 33 in the feed direction F, the compounds refuse as a rod. If the pins 35 are provided in the core member 33, then spaces are formed in the inner compound 66, which spaces later will constitute flush channels. The pins are chosen long enough to allow the compound 66 to cool around them such that fusion is avoided.

Then the rod reaches the spacing 42 which is defined by the jaws 40, 41 whereby the rod 65, due to engagement with the ridges 43, moves helically through the jaws and obtain the cross-section of a helix drill. Importantly, the radial depth of the outer tube 67 is made sufficiently large that flutes of adequate depth can be formed entirely therein, the flutes being spaced from the central core portion 12. Thus, in contrast to the prior art, the chip flutes of the drill made in accordance with the present invention will consist entirely of the more wear resistant hard metal.

When the rod exits the jaws as a tool blank, it cools quickly due to the surrounding temperature, and the blank continues to extrude until the chip flute part is sufficiently long. Subsequently the jaws 40, 41 are drawn apart such that a cylindrical (non-fluted) mounting portion of the shank is formed to be used to mount the tool in a holder. The length of the mounting portion is determined either by how long the extrusion is continued or by when the jaws are displaced back inwardly such that a new blank is initiated. In the latter case two or more blanks are continuous. The solidified blank can then be cut or be broken, for example by hand.

Then the blank is heated in a separate furnace such that the carrier is burned off and such that the binder metal melts and binds the carbide. Then further machining takes place, such as grinding for example at edge portions, shank portion and clearance surfaces.

Thus the outer periphery of the tool obtains a higher wear resistance due to the lower content of binder, for example cobalt, while the center portion is formed of a tougher hard material than the outer periphery due to a greater ratio of cobalt.

With the present method a tool with a long service life can be produced with or without a non-fluted shank portion and allows a simple handling at a low cost. This can be done without generating dust. In addition at least one jaw could function to make marks in the shank portion of the blank where a plane is to be ground for chucking. Thereby the grinding volume can be minimized.

The invention is in no way limited to the above described embodiments but can be varied freely within the scope of the appended claims. Thus the invention can be used also for solid end mills. The tool can be coated with layers of for example $Al_2O_3$, TiN and/or TiCN.

What is claimed is:

1. A method for manufacturing a tool for chip removing machining, the tool comprising a central portion disposed within an outer peripheral portion, the central portion formed of a tougher, less wear-resistant material than the outer peripheral portion, the method comprising the steps of:

A) feeding a warm first plastic compound comprised of a hard material and metallic binder to an inner extrusion die for forming the central portion;

B) simultaneously feeding a warm second plastic compound comprised of a hard material and metallic binder to an outer extrusion die, arranged coaxially with the first die, for forming the outer peripheral portion coaxially around the first plastic compound, whereby the second plastic compound abuts the first plastic compound during the extrusion to form therewith a rod, the second plastic compound being more wear-resistant and less tough than the first plastic compound; thereafter C) conducting the rod past a flute-forming structure which forms at least one chip flute entirely in the outer peripheral portion, the chip flute being spaced from the central portion; and thereafter D) heating the first and second plastic compounds as a unit to drive off a polymer present in those compounds and the sinter the remainder of those compounds into a hard blank.

2. The method according to claim 1 wherein prior to step A the first compound is formed by mixing a hard metal powder and a carrier, such as a polymer, together with a metallic binder and inserted into a first chamber; and prior to step A the second compound is formed by mixing the hard metal powder and the carrier together with the metallic binder and inserted into a second chamber separate from the first chamber; the ratio of metallic binder in the first compound being less than in the second compound.

3. The method according to claim 2 wherein step C comprises forming a plurality of chip flutes entirely in the outer peripheral portion and spaced from the central portion.

4. The method according to claim 3 wherein following the formation of chip flutes, the flute-forming structure is displaced to terminate the formation of chip flutes in a subsequently produced shank portion of the tool.

5. The method according to claim 1 wherein step C comprises forming a plurality of chip flutes entirely in the outer peripheral portion and spaced from the central portion.

6. The method according to claim 5 wherein following the formation of chip flutes, the flute-forming structure is displaced to terminate the formation of chip flutes in a subsequently produced shank portion of the tool.

7. The method according to claim 6 wherein the flute-forming structure comprises a pair of movable jaws disposed on opposite sides of a path of travel of the second compound, the displacement of the flute-forming structure performed by moving the two jaws away from one another in a direction perpendicular to the path of travel.

8. The method according to claim 1 wherein step B comprises conducting the first and second compounds past a core element firmly anchored to the die, and then causing the first and second compounds to fuse into respective cylindrical bodies downstream of the core element.

9. The method according to claim 8 wherein the core element includes pins extending parallel to a direction of travel of the first and second compounds past the core element, the first compound being shaped by the pins to form flush channels in the tool.

10. The method according to claim 1 further including, subsequent to step C the step of finish machining the tool.

11. Apparatus for making a tool for chip-forming machining comprising:

a housing having a recess extending therethrough;

first and second coaxial nozzles for coaxially conducting first and second compounds into an inlet end of the recess, for forming a central core and an outer tube connected to the central core;

a die disposed in the recess and containing a hole through which the first and second compounds pass; and a flute-forming structure disposed adjacent an outlet of the recess and configured to form at least one chip flute entirely in the outer tube and spaced from the central core.

12. The apparatus according to claim 11 further including first and second feed worms for supplying the first and second compounds, respectively, to the first and second nozzles.

13. The apparatus according to claim 12 further including first and second jaws situated downstream of the die and movable to an inner position in engagement with the second compound received from the die for applying a shape thereto, the jaws being movable in a direction away from one another to an outer position to avoid applying the shape to the second compound.

14. The apparatus according to claim 13 wherein the recess has a circular cross section and further including a rectangular core disposed in the die, a pair of pins projecting from the core in a downstream direction for forming flush channels in the tool.

15. The apparatus according to claim 13 wherein each jaw includes a helical ridge for contacting the second compound to form a chip flute therein.

16. A tool for chip removing machining comprising a center core and an outer tube, the center core and the outer tube formed of respective first and second compounds, wherein the first compound is tougher and less wear-resistant than the second compound, the tool including a front cutting edge and a chip flute for each cutting edge, the chip flute disposed entirely in the outer tube, the tool formed by the steps of:
  A) feeding the first and second compound to first and second coaxially arranged dies whereby the first and second compounds form the core and the tube, respectively; thereafter
  B) forming at least one chip flute entirely in the tube and spaced from the core; and thereafter
  C) heating the first and second compounds as a unit to drive off a polymer contained by the first and second compounds, and to sinter the remainder to a hard blank.

17. A method for manufacturing a tool for chip removing machining, the tool comprising a central portion disposed within an outer peripheral portion, the central portion formed of a tougher, less wear-resistant material than the outer peripheral portion, the method comprising the steps of:
  A) feeding a warm first plastic compound comprised of a hard material and metallic binder to an inner extrusion die for forming the central portion;
  B) simultaneously feeding a warm second plastic compound comprised of a hard material and metallic binder to an outer extrusion die, arranged coaxially with the first die, for forming the outer peripheral portion coaxially around the first plastic compound, whereby the second plastic compound abuts the first plastic compound during the extrusion to form therewith a rod, the second plastic compound being more wear-resistant and less tough than the first plastic compound; and
  C) heating the first and second plastic compounds as a unit to drive off a polymer present in those compounds and to sinter the remainder of those compounds into a hard blank,
  wherein prior to step A the first compound is formed by mixing a hard metal powder and a carrier, such as a polymer, together with a metallic binder and inserted into a first chamber; and prior to step A the second compound is formed by mixing the hard metal powder and the carrier together with the metallic binder and inserted into a second chamber separate from the first chamber; the ratio of metallic binder in the first compound being less than in the second compound,
  wherein following step B the rod is conducted past a flute-forming structure which forms chip flutes in the outer surface of the rod,
  wherein following the formation of the chip flutes, the flute-forming structure is displaced to terminate the formation of the chip flutes in a subsequently produced shank portion of the tool.

18. A method for manufacturing a tool for chip removing machining, the tool comprising a central portion disposed within an outer peripheral portion, the central portion formed of a tougher, less wear-resistant material than the outer peripheral portion, the method comprising the steps of:
  A) feeding a warm first plastic compound comprised of a hard material and metallic binder to an inner extrusion die for forming the central portion;
  B) simultaneously feeding a warm second plastic compound comprised of a hard material and metallic binder to an outer extrusion die, arranged coaxially with the first die, for forming the outer peripheral portion coaxially around the first plastic compound, whereby the second plastic compound abuts the first plastic compound during the extrusion to form therewith a rod, the second plastic compound being more wear-resistant and less tough than the first plastic compound; and
  C) heating the first and second plastic compounds as a unit to drive off a polymer present in those compounds and to sinter the remainder of those compounds into a hard blank,
  wherein following step B the rod is conducted past a flute-forming structure which forms chip flutes in the outer surface of the rod,
  wherein following the formation of the chip flutes, the flute-forming structure is displaced to terminate the formation of the chip flutes in a subsequently produced shank portion of the tool.

19. Apparatus for making a tool for chip-forming machining comprising:
  a housing having a recess extending therethrough;
  first and second coaxial nozzles for coaxially conducting first and second compounds into an inlet end of the recess, for forming a central core and an outer tube connected to the central core;
  a die disposed in the recess and containing a hole through which the first and second compounds pass;
  first and second feed worms for supplying the first and second compounds, respectively, to the first and second nozzles; and
  first and second jaws situated downstream of the die and movable to an inner position in engagement with the second compound received from the die for applying a shape thereto, the jaws being movable in a direction away from one another to an outer position to avoid applying the shape to the second compound.

* * * * *